United States Patent [19]

Treche

[11] Patent Number: 5,547,305
[45] Date of Patent: Aug. 20, 1996

[54] RAPID, TOOL-LESS ADJUSTING SYSTEM FOR HOTSTICK TOOLING

[75] Inventor: Ronald Treche, Glendale, Ariz.

[73] Assignee: The Whitaker Corporation, Wilmington, Del.

[21] Appl. No.: 397,333

[22] Filed: Mar. 2, 1995

[51] Int. Cl.⁶ ..................... H01R 13/00
[52] U.S. Cl. ............. 403/97; 403/103; 403/96; 439/480
[58] Field of Search ............ 439/480, 13, 11; 81/177.8, 177.7; 269/59, 60, 61, 70, 74, 81; 403/97, 101, 103, 92, 96, 93

[56] References Cited

U.S. PATENT DOCUMENTS

| | | |
|---|---|---|
| 1,840,150 | 1/1932 | Bodendieck ............ 81/177.7 X |
| 3,205,522 | 9/1965 | Then . |
| 4,253,649 | 3/1981 | Hewson ................ 403/97 X |
| 4,614,452 | 9/1986 | Wang . |
| 4,745,680 | 5/1988 | Williams et al. . |
| 4,805,494 | 2/1989 | Santoro .............. 81/177.8 X |
| 4,848,818 | 7/1989 | Smith . |
| 4,917,343 | 4/1990 | Wainscott . |

FOREIGN PATENT DOCUMENTS 1484798  9/1977  United Kingdom .......... 403/113

Primary Examiner—Anthony Knight
Attorney, Agent, or Firm—Mary K. Van Atten

[57] ABSTRACT

A hotstick component has a fastening subassembly for securing the component to another component or a hotstick and allowing reorientation of the component with respect to the hotstick while it is still attached. The component has a fastening end with a through hole. A fastening subassembly includes a screw member and a spring member. The screw member is received through the through hole and secures the other component to the hot stick component. The spring member is received along the screw member and maintains the component in an engaged position. The component is reoriented by moving it against the spring member into a disengaged position, readjusting the component's position, then allowing the spring member to push the component into an engaged position.

14 Claims, 6 Drawing Sheets

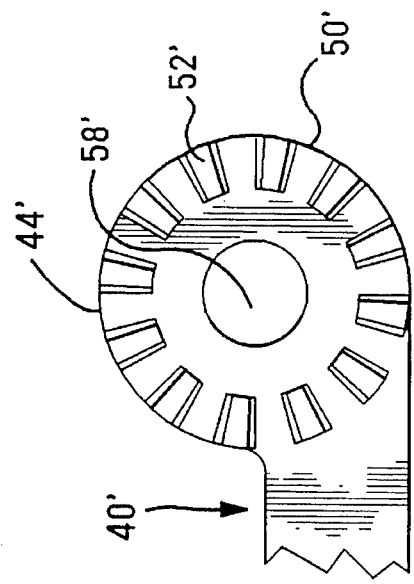
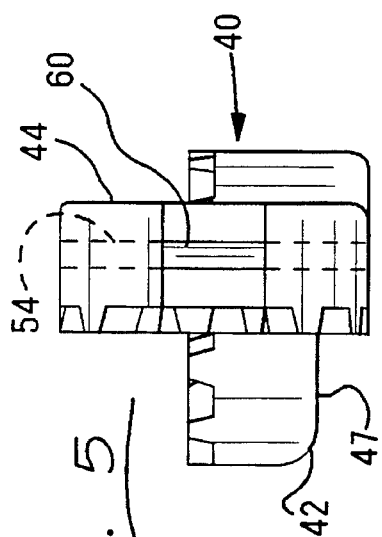
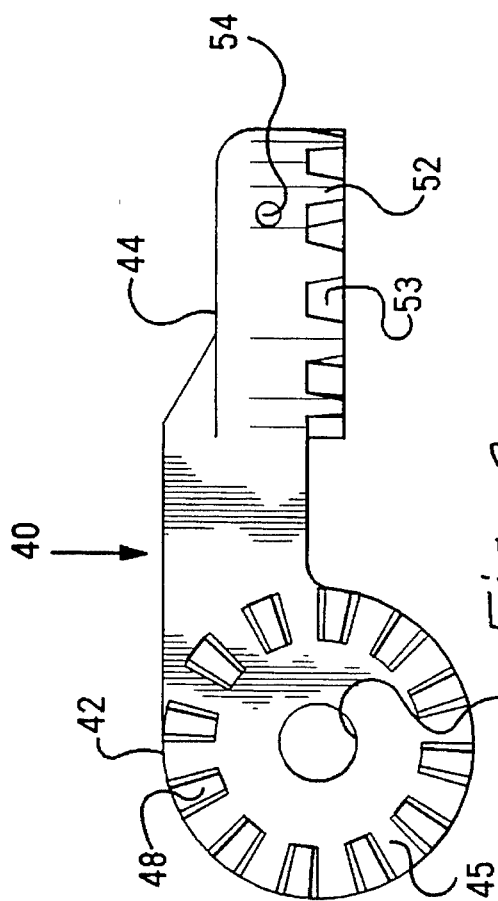
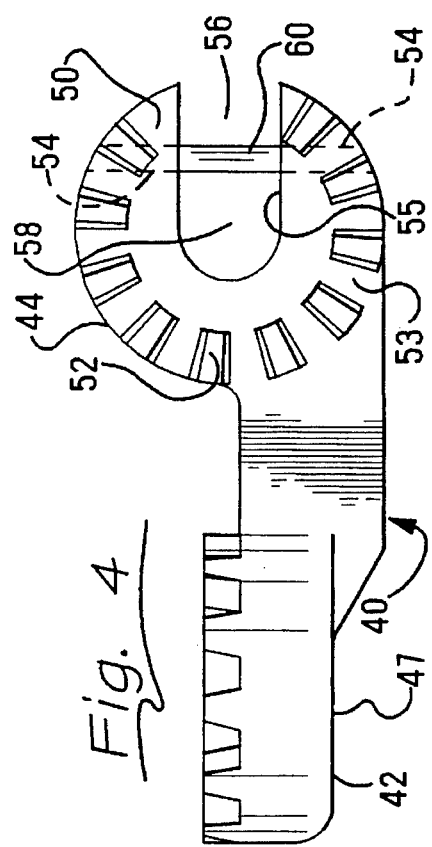

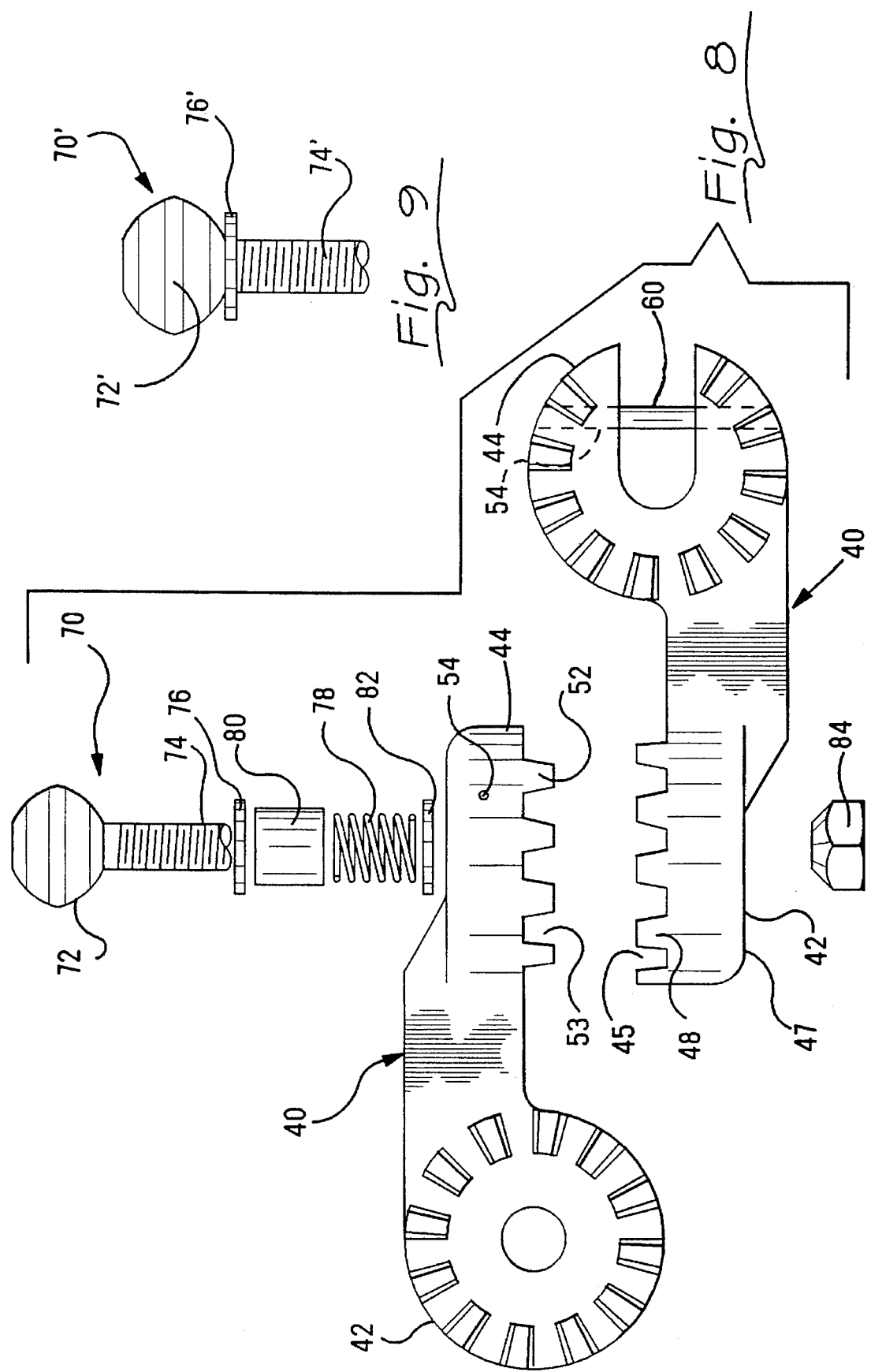

RAPID, TOOL-LESS ADJUSTING SYSTEM FOR HOTSTICK TOOLING

FIELD OF THE INVENTION

The invention relates to hotstick components and a fastening subassembly for allowing adjustment of the components without using tools and without separating the parts.

BACKGROUND OF THE INVENTION

Typically, a component, such as an adapter or tool holder, is secured to the end of a hotstick by a regular screw or bolt head. One end of the adapter or tool holder is a C-shaped member having teeth along one face. The teeth are secured against teeth on the hotstick, a screw is received in the center of the C-shaped member and the two are secured together by the screw or bolt head.

Adjustments of the adapters and tool holders require screwdrivers, wrenches and pliers. While making adjustments, the components can separate. In the field, several extra tools are necessary and there is always the danger of dropping components while the hotstick is being used on top of a utility pole.

It would be desirable to have a means to quickly and easily adjust the components without having them fall apart and without the use of tools.

SUMMARY OF THE INVENTION

The invention relates to hotstick components which can be secured to another component or a hotstick. The component includes a fastening end. A fastening subassembly secures the fastening end of the component to another component or a hotstick while springably maintaining the component in an engaged position in which the orientation with respect to the other component is fixed. The component is moved into a disengaged position wherein the component is free to rotate and thereby change the orientation of the components with respect to each other.

BRIEF DESCRIPTION OF THE DRAWINGS

Embodiments of the present invention will now be described by way of example with reference to the accompanying drawings, in which:

FIGS. 3 and 4 are side views of the adapter;

FIG. 5 is an end view of the adapter;

FIG. 6 is an alternative embodiment of the adapter;

FIG. 8 is an exploded perspective view similar to FIG. 7;

FIG. 9 is an alternative embodiment similar to FIG. 8; and

DETAILED DESCRIPTION OF THE DRAWINGS

Figure 2:
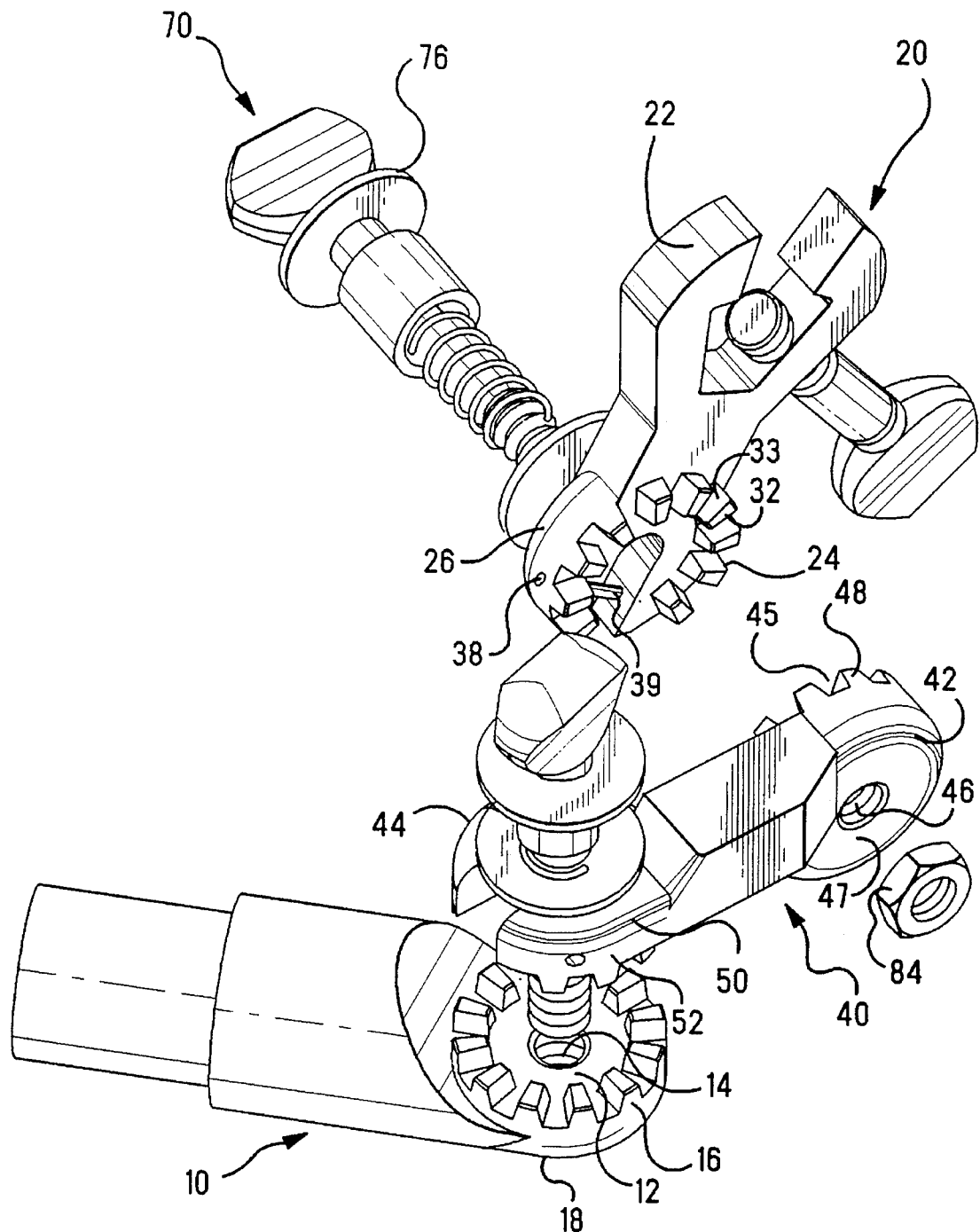
FIG. 2 is an exploded perspective view similar to FIG. 1.

On one end of a typical hotstick 10, there is a tool receiving area 12 having a threaded hole 14 and teeth 16 around the periphery of the tool receiving end 12, see FIG. 2. The threaded hole 14 extends all the way through the tool receiving area 12 to the back 18 of the tool receiving area.

Figure 10:
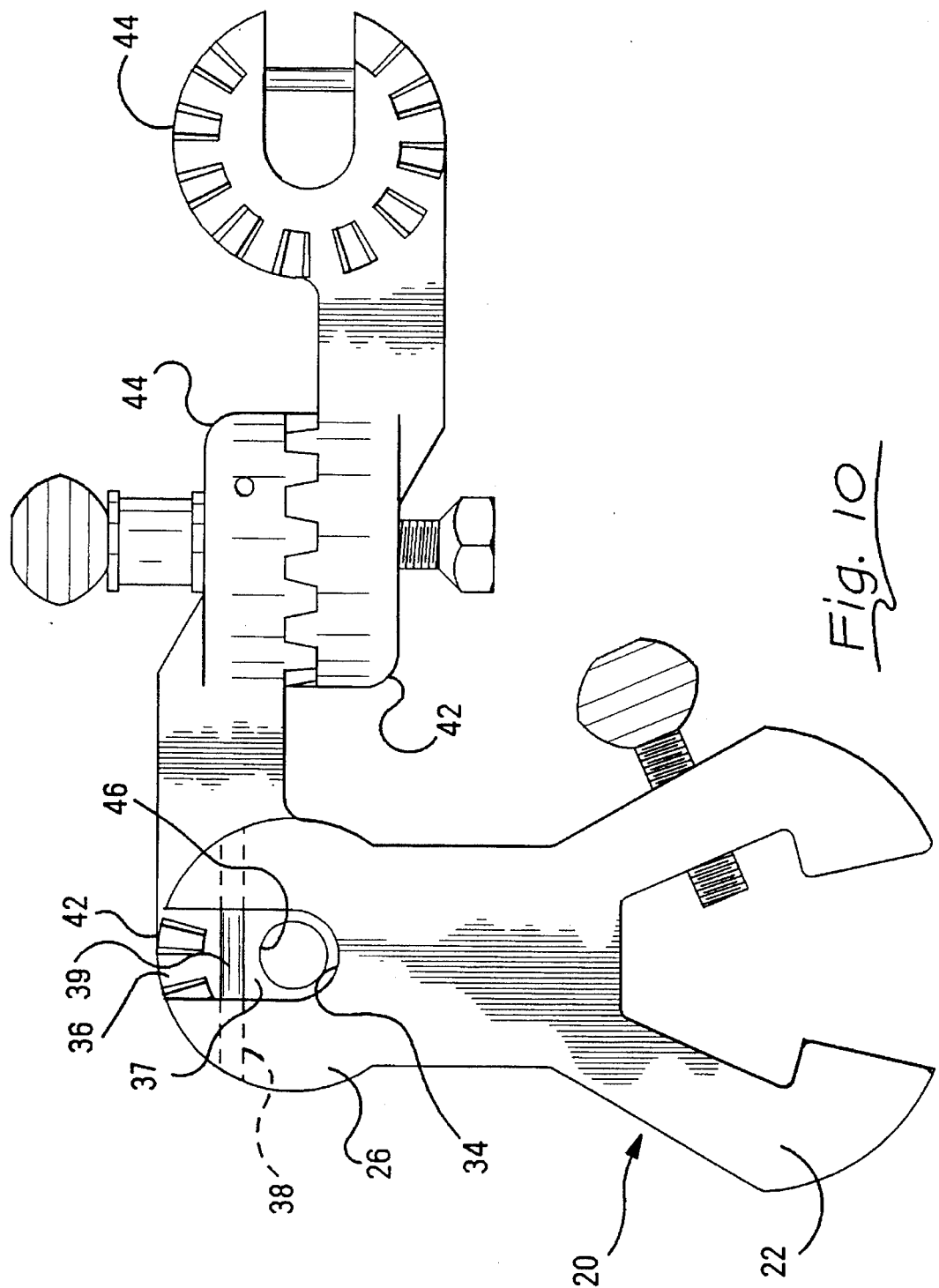
FIG. 10 is a view similar to FIG. 7 showing the connection of a tool.

The hotstick 10 can receive components such as a tool holder 20 like the AMPACT tool holder shown or an adapter 40. There are several other types of tools which are available to be mounted onto a hotstick other than the tool shown. The tool holder 20 has a working end 22 for performing some function, holding a tool in this example. The tool holder 20 also has a fastening end 24. While there are several types of tools, they all have a similar fastening end. The fastening end 24 has a C-shaped member 26, see FIG. 2. One side has teeth 32 disposed about the periphery of C-shaped member 26 and having recesses 33 disposed between the teeth 32. The C-shaped member 26 has inner walls 34 and a mouth 36, see FIG. 10.

The 90° adapter 40 has a tool receiving end 42 and a fastening end 44, see FIG. 3. The tool receiving end 42 is similar to the tool receiving end 12 on the hotstick 10. The tool receiving end 42 has a threaded hole 46, teeth 48 disposed circularly about the hole 46, and recesses 45 disposed between the teeth 48. The threaded hole 46 extends all the way through to the back 47 of the tool receiving end 42. The fastening end 44 is similar to the fastening end 24 of the tool 20. The fastening end 44 is disposed 90° from the tool receiving end 42, see FIG. 5, and has a C-shaped member 50 with teeth 52 disposed therearound having recesses 53 disposed between the teeth 52. The C-shaped member 50 has inner walls 55 with a mouth 56.

The components can be secured to the hotstick in a variety of different sequences. A tool can be secured directly to a hotstick. Alternatively, one 90° adapter can be used between the hotstick and the tool, see FIG. 1. Further, the use of two 90° adapters between the tool and the hotstick provides even greater flexibility in the orientation of the tool with respect to the hotstick, see FIG. 10. The components are secured together when the tool receiving end of one component is aligned with the fastening end of another component and when the teeth on one component are aligned with the recesses between the teeth on the other component so that they can be interlocked with each other.

For simplicity, the connection between two 90° adapters will be described, however the same concept is used to secure the other components together. Two holes 54 are drilled through the C-shaped member 50 of the adapter 40 from the outer walls, through to the inner walls 55 and are in alignment with each other. A roll pin 60 is placed through the holes 54 and extends across the mouth 56 of the C-shaped member thereby forming an enclosed through hole 58 in the center of the C-shaped member 50. The roll pin 60 is secured within the hole 54 by an interference fit.

Figure 7:
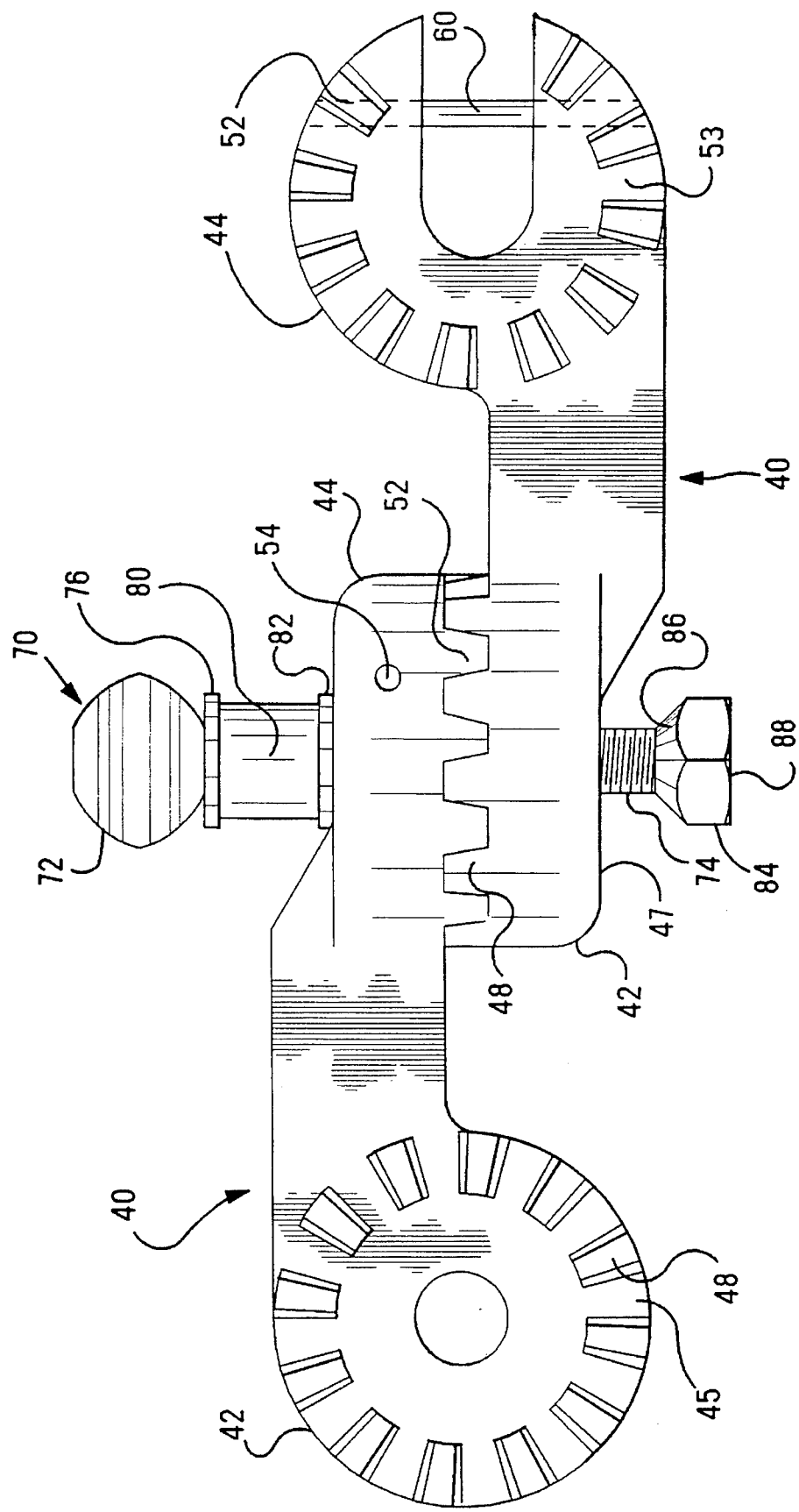
FIG. 7 is the fastening system of the present invention.

A first adapter 40 (on the left in FIG. 7) is secured to second adapter 40 (on the right in FIG. 7) by means of a fastening subassembly. The fastening subassembly includes a thumb screw 70 having a head 72 and a threaded portion 74. A washer 76 is received on the screw 70 proximate to the head 72. A spring 78 is received on the screw 70 next to the washer. A metal tube 80 is disposed over top of the spring 78, as is shown in FIG. 8. A second washer 82 is received on the screw 70 next to the spring.

Alternatively, a thumb screw 70' can be used as is illustrated in FIG. 9, wherein the first washer is an integral part of the thumb screw 70'. The first washer 76' is disposed at the junction of the head 72' and the threaded portion 74'. This reduces the number of parts that are needed to form the fastening subassembly.

The screw 70 is then received into the through hole 58 between the roll pin 60 and the inner walls 55 of the C-shaped member 50 of the first adapter 40. The second washer 82 is received adjacent the C-shaped member 50. The spring is disposed between the washers 76,82 and the tube 80 covers the spring. The teeth of the fastening end 44 of the first adapter are aligned with the recesses between the teeth on the tool receiving end 42 of the second adapter so that they can be interlocked. The thumb screw 70 is then screwed into the threaded hole 46 of the second adapter. The threaded portion of the thumb screw extends through the back 47 of the tool receiving end. A lock nut 84 is secured on the threaded end to keep the thumb screw 70 from being removed from the threaded hole 46. The use of the lock nut 84 thereby secures the components together. The lock nut 84 is placed on the thumb screw 70 with the angled portions 86 facing the adapter. This allows the lock nut 84 to be received closer to the adapter than the flat portion 88 of the lock nut could be received.

When the screw 70 is screwed completely in the threaded hole 46, the adapters 40 are in an engaged position with respect to each other. The adapters 40 are maintained in the specific orientation with respect to each other by the pressure of the head 72 against the washer 76, the tubing 80, and the second washer 82 being tight against the C-member 50. The teeth on the first adapter are received within the recesses of the second adapter and the teeth of the second adapter are received within the recesses of the first adapter, thereby maintaining the orientation.

Figure 1:
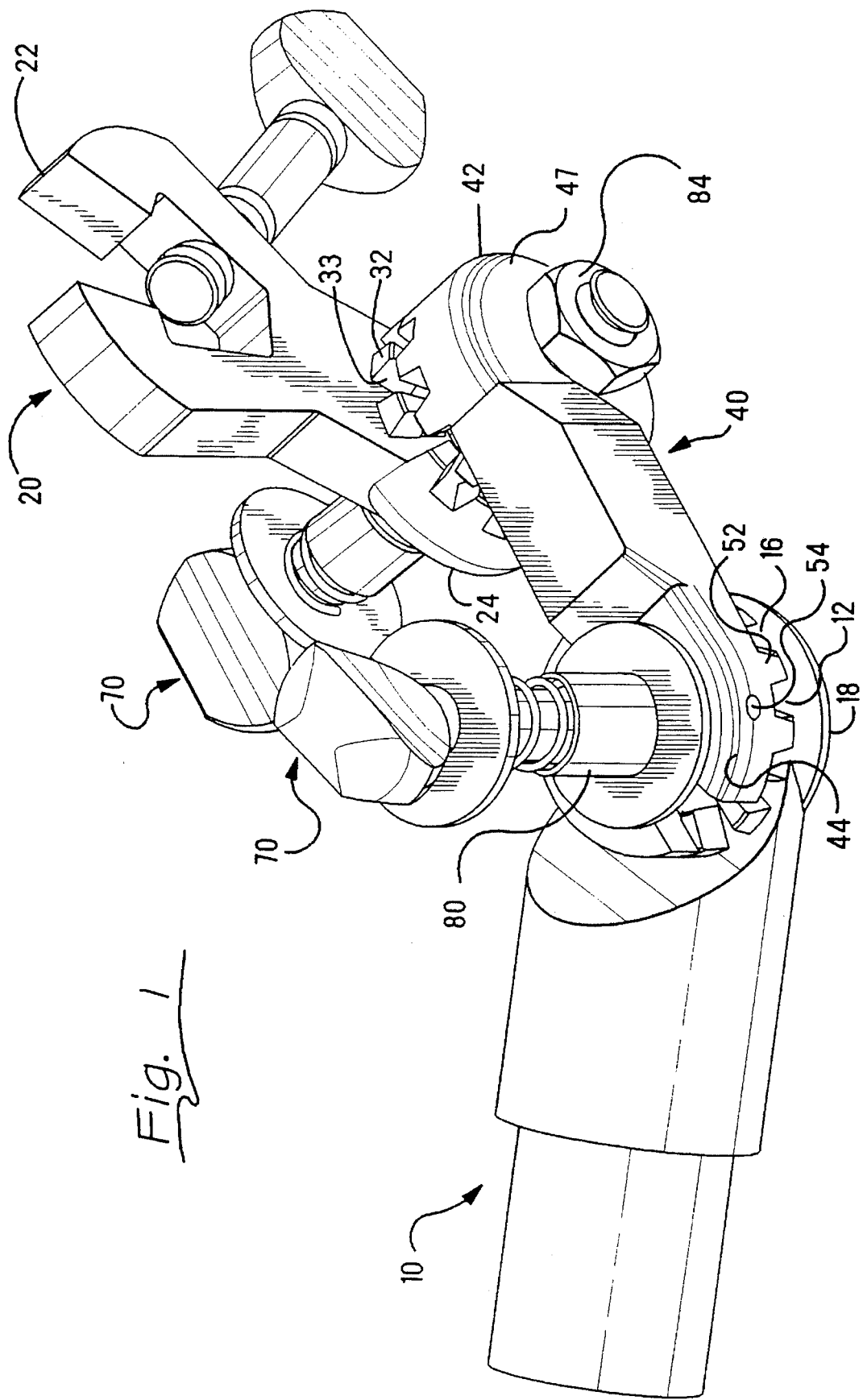
FIG. 1 is a perspective view showing the connection of a hotstick, an adapter, a tool holder, and a fastening subassembly.

When the thumb screw 70 is partially unscrewed, the spring 78 holds the first adapter against the second adapter 40 in the engaged position. The lock nut 84 is positioned such that the thumb screw 70 can be unscrewed enough to allow the parts to be adjusted with respect to each other, but the components will still be secured to each other. The first adapter 40 can then be moved away from the second adapter 40 into a disengaged position by pushing the first adapter against the washer 82 and the spring 78. The disengaged position occurs when the teeth are pulled free of each other. The tubing 80 prevents the adapter 40 from being moved too much against the spring 78 and thereby damaging the spring 78. The first adapter 40 can then be rotated about the screw member 70 and reoriented with respect to the second adapter 40 by moving the teeth 48,52 past each other. When the desired orientation is achieved, the teeth 48,52 are pushed back together into an engaged position by the spring forces of the spring 78. The screw 70 is then tightened to maintain the adapters 40 in the engaged position. The orientation of the adapters 40 can thereby be changed with respect to each other, without tools and without separating the components. FIG. 1 shows an example of an adapter 40 and a tool 20 being adjusted with respect to each other, in a similar manner the adapters can be adjusted with respect to each other. The tool holder has been pulled away from the adapter so that the teeth are free from each other. The tool 20 is now free to rotate about the thumb screw 70 to a new orientation.

The tool 20 also has two holes 38 in the fastening end 24 which goes through the C-shaped member 26 in a similar manner as was shown on the adapter 40. There is a similar roll pin 39 secured in the holes 38 across the mouth 36 to form a through hole 37. The thumb screw 70 of the fastening subassembly is received through the through hole 37. The tool 20 can be connected to the hotstick 10 or to an adapter 40 and adjusted as was described earlier for the two adapters 40.

In an alternative embodiment of the invention, the adapter 40', or a tool (not shown), has an O-shaped member 50' replacing their respective C-shaped members on the fastening end 44', see FIG. 6. The teeth 52' are disposed around the O-shaped member and there is a through hole 58' disposed in the center of the O-shaped member 50'. The teeth 52' are shown distributed all around the O-shaped member 50', but the teeth 52' can be disposed only partially around the O-shaped member and still be able to maintain the set orientation. The same fastening subassembly is used as was described in the previous embodiment. The thumb screw 70 is received through the center hole of the O-shaped member and the components are secured together and reoriented in the same manner as was described earlier.

The present invention provides a means of securing a tool to a hotstick, or to secure a tool to an adapter to a hotstick, or alternatively to secure a tool and a hotstick together with two adapters disposed therebetween. The tool and the adapter can be adjusted with respect to the hotstick and to each other. They can be readjusted without separating the components and they are held together during the course of the readjustment.

The hotstick components and tool less adjusting system of the present invention and many of the attendant advantages will be understood from the foregoing description. It is apparent that various changes may be made in the form, construction, and arrangement of parts thereof without departing from the spirit or scope of the invention, or sacrificing all of its material advantages.

I claim:

1. A hotstick component to be secured to another component, comprising:

a body having a fastening end; and a fastening subassembly which secures said fastening end of the body to the other component said fastening end includes a through hole and said fastening subassembly includes a screw member and a spring member, said spring member is disposed over said screw member and said screw member is received through said through hole to threadably engage the other component, the body is springably maintained in an engaged position in which the orientation of the body is fixed, wherein said fastening end includes a C-shaped member having inner walls and a mouth, two holes are disposed through said C-shaped member intersecting said mouth, a pin is disposed in the holes to bisect said mouth and form said through hole between said pin and said inner walls the fastening subassembly allows movement of the body into a disengaged position wherein the body is free to rotate about the fastening subassembly thereby being reoriented with respect to the other component.

2. The hotstick component of claim 1, wherein said fastening end includes teeth disposed about said through hole, the other component having complementary other teeth, said teeth engage said other teeth on the other component while in the engaged position.

3. The hotstick component of claim 1, wherein the body is an adapter having a tool receiving end opposite to said fastening end, said tool receiving end being able to be connected to the other component.

4. The hotstick component of claim 1, wherein said body is a tool holder and has a working end.

5. The hotstick component of claim 1, wherein said fastening subassembly further comprises a tube to be received over the spring member to protect the spring member from damage, a washer to be received between said fastening end and said spring member and said tube, and a lock member to be received on the end of said screw member to secure the other component thereto.

6. The hotstick component of claim 5, wherein said fastening subassembly includes a washer disposed between a head and said spring.

7. The hotstick component of claim 5, wherein said screw member includes an integral washer disposed at a junction between said head and said threaded portion.

8. A hotstick component to be secured to another component, comprising:

a body having a fastening end, said fastening end having a through hole therein; and a fastening subassembly including a connecting member and a spring member said fastening end includes a through hole and said connecting member is a screw member, said spring member is disposed over said screw member and said screw member is received through said through hole to threadably engage the other component, said fastening end includes a C-shaped member having inner walls and a mouth, two holes are disposed through said C-shaped member intersecting said mouth, a pin is disposed in the holes to bisect said mouth and form said through hole between said pin and said inner walls, wherein the connecting member secures said fastening end of the body to the other component, and the spring member springably maintains the body in an engaged position in which the orientation is fixed, said fastening subassembly allows movement of the body into a disengaged position wherein the body is free to rotate about the fastening subassembly thereby being reoriented with respect to the other component.

9. The hotstick component of claim 8, wherein said fastening end includes teeth disposed about said through hole, the other component having complementary other teeth, said teeth engage said other teeth on the other component while in the engaged position.

10. The hotstick component of claim 8, wherein the body is an adapter having a tool receiving end opposite to said fastening end, said tool receiving end being able to be connected to the other component.

11. The hotstick component of claim 8, wherein said body is a tool holder and has a working end.

12. The hotstick component of claim 8, wherein said fastening subassembly further comprises a tube to be received over the spring member to protect the spring member from damage, a washer to be received between said fastening end and both said spring member and said tube, and a lock member to be received on the end of said screw member to secure the other component thereto.

13. The hotstick component of claim 12, wherein said fastening subassembly includes a washer disposed between a head and said spring.

14. The hotstick component of claim 12, wherein said screw member includes an integral washer disposed at a junction between said head and said threaded portion.

* * * * *